US009140336B2

(12) United States Patent
Goleski

(10) Patent No.: US 9,140,336 B2
(45) Date of Patent: Sep. 22, 2015

(54) MULTI-SPEED TRANSMISSION

(71) Applicant: FORD GLOBAL TECHNOLOGIES, LLC, Dearborn, MI (US)

(72) Inventor: Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/052,814

(22) Filed: Oct. 14, 2013

(65) Prior Publication Data
US 2014/0038764 A1 Feb. 6, 2014

Related U.S. Application Data

(63) Continuation-in-part of application No. 13/566,465, filed on Aug. 3, 2012, now Pat. No. 8,574,113.

(51) Int. Cl.
| | |
|---|---|
| *F16H 3/44* | (2006.01) |
| *F16H 3/62* | (2006.01) |
| *F16H 3/66* | (2006.01) |

(52) U.S. Cl.
CPC .. *F16H 3/62* (2013.01); *F16H 3/66* (2013.01); *F16H 2200/0069* (2013.01); *F16H 2200/2012* (2013.01); *F16H 2200/2046* (2013.01); *F16H 2200/2084* (2013.01); *F16H 2200/2094* (2013.01); *F16H 2200/2097* (2013.01)

(58) Field of Classification Search
CPC ..... F16H 3/62; F16H 3/66; F16H 2200/2094; F16H 2200/2084; F16H 2200/2046; F16H 2200/0069; F16H 2200/2097; F16H 2200/2012

USPC ............... 475/282, 271, 311, 317, 323, 5, 3; 477/5, 3
See application file for complete search history.

(56) References Cited

U.S. PATENT DOCUMENTS

| | | |
|---|---|---|
| 7,597,646 B2 | 10/2009 | Kamm et al. |
| 7,645,207 B2 | 1/2010 | Kamm et al. |
| 7,682,282 B2 | 3/2010 | Kamm et al. |
| 7,691,024 B2 | 4/2010 | Phillips et al. |
| 7,789,792 B2 | 9/2010 | Kamm et al. |
| 7,980,986 B2 | 7/2011 | Kamm et al. |
| 8,092,336 B2 | 1/2012 | Hart et al. |
| 8,157,697 B2 | 4/2012 | Hart et al. |
| 8,231,495 B2 | 7/2012 | Gumpoltsberger et al. |
| 8,251,855 B2 | 8/2012 | Diosi et al. |
| 8,303,455 B2 | 11/2012 | Gumpoltsberger et al. |
| 8,328,678 B2 | 12/2012 | Seo et al. |
| 8,333,676 B2 | 12/2012 | Kim |
| 8,465,390 B2 | 6/2013 | Brehmer |
| 8,808,134 B2 * | 8/2014 | Saitoh et al. .................. 475/276 |

(Continued)

OTHER PUBLICATIONS

H. Benford, M. Leising, The Lever Analogy: A New Tool in Transmission Analysis, 1982, Society of Automotive Engineers, Inc. 810102, p. 429-437.

*Primary Examiner* — David J Hlavka
(74) *Attorney, Agent, or Firm* — James Dottavio; Brooks Kushman P.C.

(57) ABSTRACT

A transmission gearing arrangements produces up to ten forward and one reverse speed ratios by selective engagement of various combinations of four shift elements. Each disclosed transmission includes four planetary gear sets and at least six shift elements. One of the shift elements may be a dog clutch. Optional passive one way brakes simplify the control.

24 Claims, 3 Drawing Sheets

(56) References Cited

U.S. PATENT DOCUMENTS

| | | | |
|---|---|---|---|
| 8,852,047 B2* | 10/2014 | Iizuka et al. | 475/276 |
| 2008/0176695 A1* | 7/2008 | Janson et al. | 475/5 |
| 2010/0032218 A1* | 2/2010 | Ideshio et al. | 180/65.225 |
| 2010/0279814 A1* | 11/2010 | Brehmer et al. | 475/275 |
| 2011/0306460 A1 | 12/2011 | Haupt et al. | |

* cited by examiner though the elements are at different speeds. However, friction clutches often transmit some parasitic torque even when disengaged. Positive engagement shift element such as dog clutches are actively controlled to be in either an engaged state or a disengaged state, but do not transfer torque between shafts that have relative rotation. Positive engagement shift elements typically exert less parasitic drag than a friction clutch of the same maximum torque capacity. Passive one way clutches permit relative rotation in one direction but allow relative rotation in the other direction. Some one way clutches can be actively controlled to enter alternative states such as preventing rotation in either direction or allowing rotation in either direction.

US 9,140,336 B2

MULTI-SPEED TRANSMISSION

CROSS-REFERENCE TO RELATED APPLICATIONS

This application is a continuation-in-part of U.S. application Ser. No. 13/566,465 filed Aug. 3, 2012, now U.S. Pat. No. 8,574,113 which issued Nov. 5, 2013, the disclosure of which is hereby incorporated in its entirety by reference herein.

TECHNICAL FIELD

This disclosure relates to the field of automatic transmissions for motor vehicles. More particularly, the disclosure pertains to an arrangement of gears; shift elements including friction clutches, one way clutches, and dig clutches; and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

The various speed ratios are typically selected by engaging certain shift elements while other shift elements are engaged. Different types of shift elements have different characteristics and properties. Automatic transmissions typically utilize a number of actively controlled friction clutches or brakes that transmit a torque between elements in response to a control signal such as a hydraulic pressure. A friction clutch or brake can transmit a controlled amount of torque even when the elements are at different speeds. However, friction clutches often transmit some parasitic torque even when disengaged. Positive engagement shift element such as dog clutches are actively controlled to be in either an engaged state or a disengaged state, but do not transfer torque between shafts that have relative rotation. Positive engagement shift elements typically exert less parasitic drag than a friction clutch of the same maximum torque capacity. Passive one way clutches permit relative rotation in one direction but allow relative rotation in the other direction. Some one way clutches can be actively controlled to enter alternative states such as preventing rotation in either direction or allowing rotation in either direction.

SUMMARY OF THE DISCLOSURE

A transmission includes an input, an output, first through fifth shafts, gearing arrangements that impose particular speed relationships, a positive engagement shift element selectively holding the third shaft against rotation, and a first clutch selectively coupling the second shaft to the fourth shaft. The positive engagement shift element may be, for example, a dog clutch. A first gearing arrangement fixedly imposes a linear speed relationship among the first shaft, the second shaft, and the third shaft. The first gearing arrangement may be, for example, a simple planetary gear set with the sun gear as the first shaft, the carrier as the second shaft, and the ring gear as the third shaft. A second gearing arrangement fixedly imposes a linear speed relationship among the first shaft, the input, and the fourth shaft. The second gearing arrangement may be, for example, a simple planetary gear set with the sun gear fixedly coupled to the first shaft, the carrier fixedly coupled to the input, and the ring gear as the fourth shaft. A third gearing arrangement selectively imposes a linear speed relationship among the fourth shaft, the output, and the fifth shaft. The third gearing arrangement may be, for example, a simple planetary gear set with the sun gear fixedly coupled to the fourth shaft, the carrier fixedly coupled to the output, and the ring gear selectively coupled to the fifth shaft by a clutch. Alternatively, the third gearing arrangement may be a simple planetary gear set with the sun gear fixedly coupled to the fourth shaft, the carrier selectively coupled to the output by a clutch, and the ring gear fixedly coupled to the fifth shaft. As yet another alternative, the third gearing arrangement may be a simple planetary gear set with the sun gear selectively coupled to the fourth shaft by a clutch, the carrier fixedly coupled to the output, and the ring gear fixedly coupled to the fifth shaft. A fourth gearing arrangement fixedly imposes a linear speed relationship among the fifth shaft, the output, and the second shaft. The fourth gearing arrangement may be, for example, a simple planetary gear set with the sun gear as the fifth shaft, the carrier fixedly coupled to the output, and the ring gear fixedly coupled to the second shaft.

In another embodiment, a transmission includes an input, an output, first through sixth shafts, gearing arrangements that impose particular speed relationships, and clutches selectively coupling various elements. A first gearing arrangement fixedly imposes a linear speed relationship among the first shaft, the second shaft, and the third shaft. A second gearing arrangement fixedly imposes a linear speed relationship among the first shaft, the input, and the fourth shaft. A third gearing arrangement fixedly imposes a linear speed relationship among the fourth shaft, the output, and the sixth shaft. The third gearing arrangement may be, for example, a simple planetary gear set with the sun gear fixedly coupled to the fourth shaft, the carrier fixedly coupled to the output, and the ring gear as the sixth shaft. A fourth gearing arrangement fixedly imposes a linear speed relationship among the fifth shaft, the output, and the second shaft. A first clutch selectively couples to the second shaft to the fourth shaft. A second clutch selectively couples to the input to the fifth shaft. A third clutch selectively couples to the fourth shaft to the fifth shaft. Finally, a fourth clutch selectively couples to the fifth shaft to the sixth shaft.

DETAILED DESCRIPTION

Figure 1:
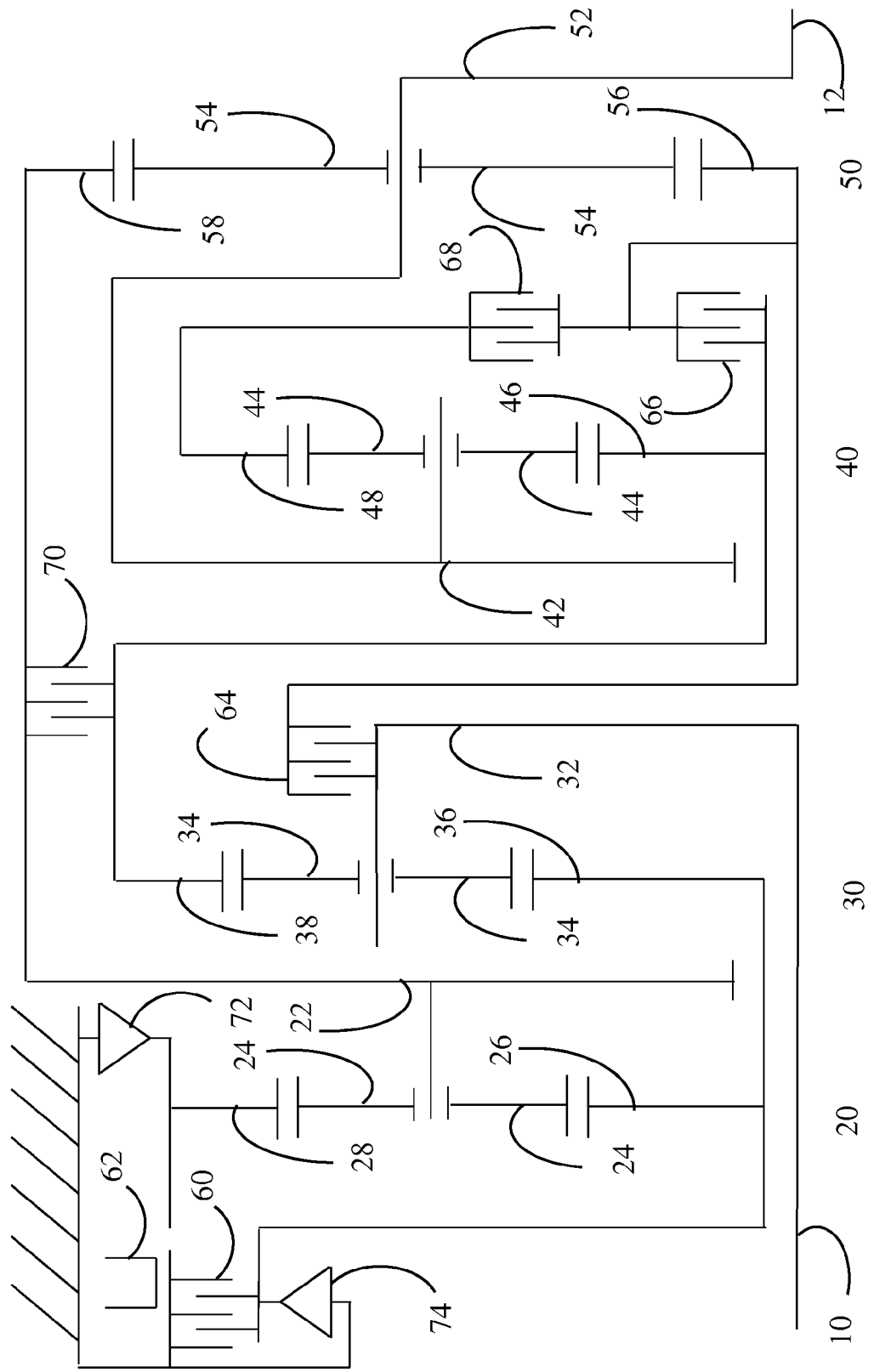
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively coupling it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

A gearing arrangement is a collection of shafts, gearing elaqments, and shift elements configured to impose specified speed relationships among the shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

An example transmission is schematically illustrated in FIG. 1. Input 10 is driven by the vehicle engine, preferably via a launch device such as a torque converter that permits the engine to idle while the input 10 is stationary. Output 12 drives the vehicle wheels, preferably via a differential which allows left and right wheels to rotate at slightly different speeds when the vehicle is turning.

The transmission utilizes four simple planetary gear sets 20, 30, 40, and 50. A planet carrier 22 rotates about the transmission axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the transmission axis. Gear sets 30, 40, and 50 are similarly structured. A suggested ratio of gear teeth for each planetary gear set in FIG. 1 is listed in Table 1.

TABLE 1

| Ring 28/Sun 26 | 1.80 |
| Ring 38/Sun 36 | 1.71 |
| Ring 48/Sun 46 | 2.00 |
| Ring 58/Sun 56 | 3.70 |

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

Sun gear 26 is fixedly coupled to sun gear 36 forming a first shaft, carrier 22 is fixedly coupled to ring gear 58 forming a second shaft, ring gear 28 forms a third shaft, ring gear 38 is fixedly coupled to sun gear 46 forming a fourth shaft, sun gear 56 forms a fifth shaft, ring gear 48 forms a sixth shaft, input shaft 10 is fixedly coupled to carrier 32, and output shaft 14 is fixedly coupled to carrier 42 and carrier 52.

Sun gear 56 is selectively coupled to input 10 by clutch 64, selectively coupled to ring gear 38 and sun gear 46 by clutch 66, and selectively coupled to ring gear 48 by clutch 68. Carrier 22 and ring gear 58 are selectively coupled to ring gear 38 and sun gear 46 by clutch 70. Clutches 64, 66, 68, and 70 may be hydraulically actuated multi-plate wet friction clutches. Hydraulic friction clutches include friction plates fixedly coupled to a first shaft intermeshed with separator plates fixedly coupled to a second shaft. When pressurized hydraulic fluid is routed to the clutch, a piston squeezes the friction plates against the separator plates selectively coupling the first shaft to the second shaft. When the hydraulic pressure is released, a return spring forces the piston away from the friction plates and separator plates such that they can rotate at different speeds relative to one another. An advantage of friction type clutches is that the shafts need not be at the same speed in order to engage the clutch. During engagement, friction brings the shafts to equal speed. A disadvantage of friction clutches is the separator plates and friction plates are still in close proximity when the clutch is released which may result in parasitic drag torque reducing the efficiency of the transmission.

Ring gear 28 is selectively held against rotation by dog clutch 62. Dog clutch 62 includes a sleeve configured to slide with respect to the transmission case but rotationally fixed to the transmission case. Teeth on the sleeve engage teeth on ring gear 28 when the sleeve is in one axial position holding ring gear 28 against rotation. When the sleeve is in an opposite axial position, ring gear 28 is free to rotate. The sleeve may be forced in one direction by a hydraulic piston and in the other direction by either a hydraulic piston or a spring. Dog clutches and other positive engagement shift elements such as synchronizers and selectable one way clutches are desirable because they exert very low parasitic drag when disengaged, relative to friction clutches. Unlike friction clutches, however, gradual engagement and disengagement of a dog clutch while the shafts have relative rotation is not feasible. Optional one way brake 72, if present, passively holds ring gear 28 against rotation in a reverse direction (opposite to the direction of engine rotation) while permitting rotation in a positive direction. If present, one way brake 72 simplifies engagement and disengagement of dog clutch 62 as discussed below. The design of a dog clutch and one way clutch combination is discussed in U.S. patent application Ser. No. 13/714,929. Alternatively, these shift elements may be replaced by a single friction brake, a controllable one way brake, or a combination of a friction brake and a one way brake.

Sun gears 26 and 36 are selectively held against rotation by brake 60 which may be a hydraulically actuated wet friction brake. Optional one way brake 74, if present, passively holds sun gears 26 and 36 against rotation in a reverse direction while permitting rotation in a positive direction. If present, one way brake 74 simplifies engagement and disengagement of brake 60 as discussed below.

Several combinations of components collectively impose particular speed relationships. Each planetary gear set imposes a fixed linear speed relationship as discussed above. The combination of gear set 40 and clutch 68 selectively imposes a linear speed relationship among the fourth shaft, the output, and the fifth shaft.

As shown in Table 2, engaging the clutches and brakes in combinations of three establishes ten forward speed ratios and one reverse speed ratio between input shaft 10 and output shaft 12. An X indicates that the clutch is engaged to establish the speed ratio. When the gear sets of FIG. 1 have tooth numbers as indicated in Table 1, the speed ratios have the values indicated in Table 2.

TABLE 2

|      | 60/74 | 62/72 | 64 | 66 | 68 | 70 | Ratio | Step |
|------|-------|-------|----|----|----|----|-------|------|
| Rev  | X     | X     |    |    | X  |    | −4.04 | 86%  |
| 1st  | X     | X     | X  |    |    |    | 4.70  |      |
| 2nd  | X     | X     |    | X  |    |    | 2.97  | 1.58 |
| 3rd  |       | X     | X  | X  |    |    | 2.03  | 1.46 |
| 4th  |       | X     |    | X  |    | X  | 1.66  | 1.22 |
| 5th  |       | X     | X  |    |    | X  | 1.46  | 1.14 |
| 6th  |       | X     | X  |    | X  |    | 1.26  | 1.16 |
| 7th  |       |       | X  |    | X  | X  | 1.00  | 1.26 |
| 8th  | X     |       | X  |    | X  |    | 0.84  | 1.19 |
| 9th  | X     |       | X  |    |    | X  | 0.69  | 1.22 |
| 10th | X     |       |    |    | X  | X  | 0.63  | 1.09 |

The transmission is prepared for forward motion in 1st gear by engaging clutch 64. If optional one way brakes 72 and 74 are both present, they will passively engage to provide the reaction torque. Dog clutch 62 and brake 60 may optionally also be engaged. If optional one way brake 74 is not present, then friction brake 60 must be engaged. If optional one way brake 72 is not present, then dog clutch 62 must be engaged. It is preferable to engage dog clutch 62 before engaging clutch 64 because, if one way brake 72 is not present, ring gear 28 will begin rotating as soon as clutch 64 is engaged. While the vehicle is stationary, ring gear 28 can be stopped by engaging three friction elements.

Upon reaching a sufficient vehicle speed in 1st gear, the transmission is shifted into 2nd gear by gradually engaging clutch 66 and releasing clutch 64. Ideally, clutch 64 is released just as the torque capacity of clutch 66 reaches a level sufficient to transmit the input torque in 2nd gear. If clutch 64 is released prematurely, then output torque will drop more than necessary and the input speed will rise quickly. This is known as a flare condition. If, on the other hand, clutch 64 is released too late, output torque will drop more than necessary in what is called a tie-up condition. However, if one way brake 74 is present and brake 60 is released, then a tie-up condition will not reduce the output torque below the level associated with 3rd gear because one way brake 74 would begin to overrun at that point.

Upon reaching a sufficient vehicle speed in 2nd gear, the transmission is shifted into 3rd by gradually engaging clutch 64. If one way brake 74 is present, then brake 60 should be released before initiating the shift. One way brake 74 will passively disengage when clutch 64 reaches the proper torque capacity. If one way brake 74 is not present, then release of brake 60 must be coordinated with engagement of clutch 64. Shifting from 3rd to 4th is accomplished by the coordinated engagement of clutch 70 and release of clutch 64. Shifting from 4th to 5th is accomplished by the coordinated engagement of clutch 64 and release of clutch 66. Shifting from 5th to 6th is accomplished by the coordinated engagement of clutch 68 and release of clutch 70.

If one way brake 72 is present, then shifting from 6th to 7th is accomplished by first releasing dog clutch 62 and then gradually engaging clutch 70. One way brake 72 will passively release when clutch 70 reaches the proper torque capacity. If one way brake 72 is not present, then release of dog clutch 62 must be coordinated with engagement of clutch 70. When a dog clutch carries torque, the force between the dog teeth creates a frictional force resisting axial movement of the sleeve. If the dog teeth are not angled, then the force required to slide the dog clutch sleeve is proportional to the torque carried by the dog clutch. To release the dog clutch at the correct time, the axial force on the sleeve is set to a slight force pushing the dog clutch out of engagement. When torque capacity of clutch 70 reaches the correct level, the torque on the dog clutch drops to zero and the sleeve slides to the disengaged position. It is important that the rate of torque capacity increase of clutch 70 be low enough that the sleeve has time to slide completely into the disengaged position before the dog clutch begins carrying torque in the opposite direction. Shifting from 7th to 8th is accomplished by the coordinated engagement of brake 60 and release of clutch 70. Shifting from 8th to 9th is accomplished by the coordinated engagement of clutch 64 and release of clutch 68. Finally, shifting from 9th to 10th is accomplished by the coordinated engagement of clutch 68 and release of clutch 64.

Most downshifts are accomplished by reversing the corresponding upshift. For example, downshifting from 8th gear to 7th gear is accomplished by the coordinated engagement of clutch 70 and release of brake 60. Downshifting from 7th gear to 6th gear requires some special controls to ensure that ring gear 28 is substantially stationary when dog clutch 62 is engaged. If the shift takes place while power is flowing from the input to the output and one way brake 72 is present, then one way brake 72 will passively stop ring gear 28 as clutch 70 is released. If the shift takes place while power is flowing from the input to the output and one way brake 72 is not present, then clutch 70 may be actively controlled based on feedback signals from speed sensors to hold the speed of ring gear 28 near zero while dog clutch 62 is engaged. If power is flowing from the output to the input when the downshift is desired, then the transmission may be placed into neutral by releasing clutch 70 completely and engine power may be used to control the speed of ring gear 28. Once dog clutch 62 is engaged, power flow from the output to the input may resume.

The transmission is prepared for reverse motion by engaging dog clutch 62, brake 60, and clutch 68. It may be desirable to leave dog clutch 62 engaged whenever the vehicle is in park, neutral, reverse, or in drive at low vehicle speed in order to avoid the need to ensure that ring gear 28 is stopped before engaging the dog clutch.

Figure 2:
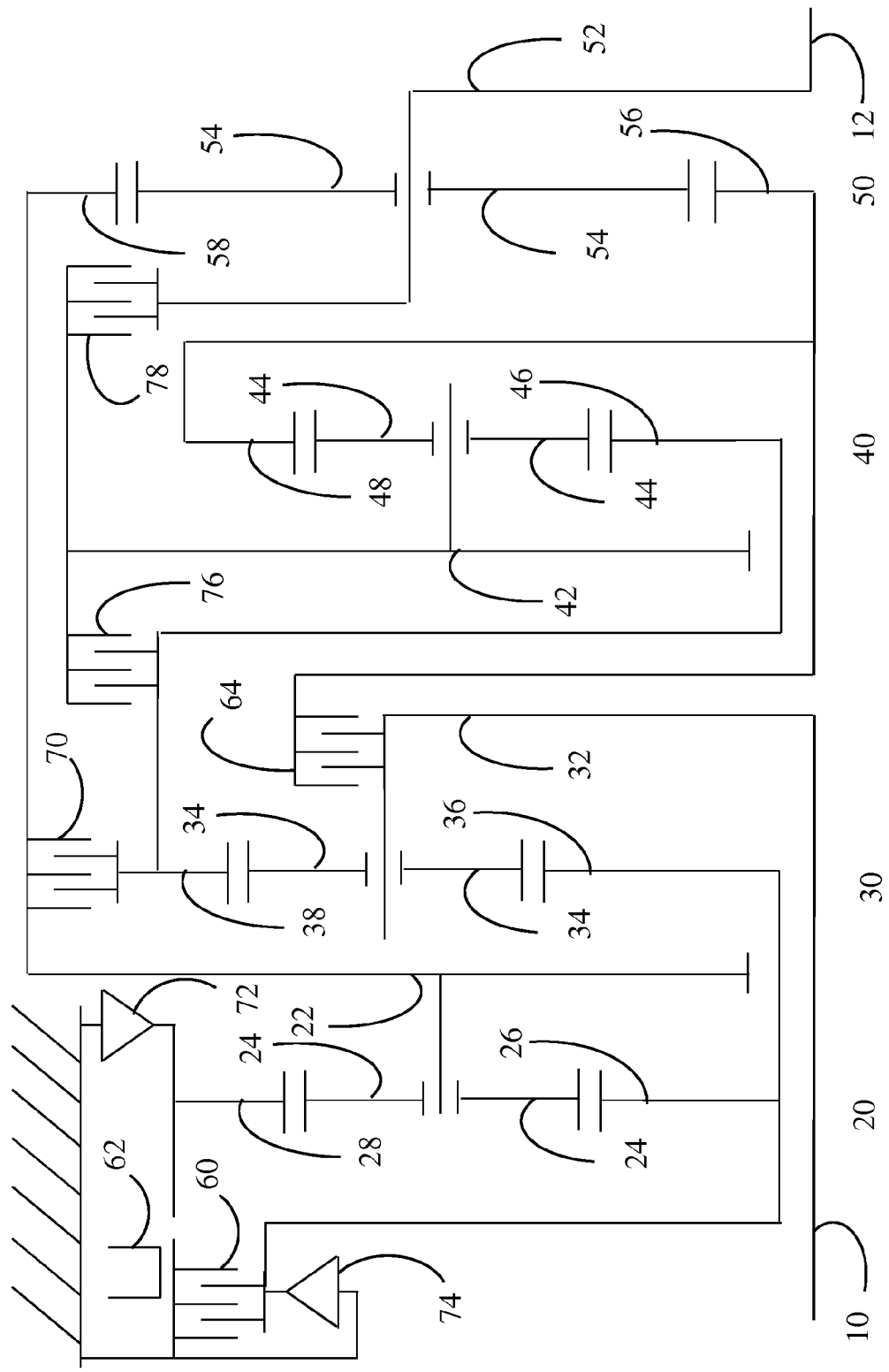
FIG. 2 is a schematic diagram of a second transmission gearing arrangement.

Another example transmission is schematically illustrated in FIG. 2. The transmission utilizes four simple planetary gear sets 20, 30, 40, and 50. A suggested ratio of gear teeth for each planetary gear set in FIG. 1 is listed in Table 1. Sun gear 26 is fixedly coupled to sun gear 36 forming a first shaft, carrier 22 is fixedly coupled to ring gear 58 forming a second shaft, ring gear 28 forms a third shaft, ring gear 38 is fixedly coupled to sun gear 46 forming a fourth shaft, ring gear 48 is fixedly coupled to sun gear 56 forming a fifth shaft, input shaft 10 is fixedly coupled to carrier 32, and output shaft 14 is fixedly coupled to carrier 52.

Ring gear 48 and sun gear 56 are selectively coupled to input 10 by clutch 64. Ring gear 38 and sun gear 46 are selectively coupled to carrier 22 and ring gear 58 by clutch 70 and selectively coupled to carrier 42 by clutch 76. Carrier 42 is selectively coupled to carrier 52 by clutch 78. Clutches 64, 70, 76, and 78 may be hydraulically actuated multi-plate wet friction clutches. Ring gear 28 is selectively held against rotation by dog clutch 62. Optional one way brake 72, if present, passively holds ring gear 28 against rotation in a reverse direction (opposite to the direction of engine rotation) while permitting rotation in a positive direction. Sun gears 26 and 36 are selectively held against rotation by brake 60 which may be a hydraulically actuated wet friction brake. Optional one way brake 74, if present, passively holds sun gears 26 and 36 against rotation in a reverse direction while permitting rotation in a positive direction.

Several combinations of components collectively impose particular speed relationships. Each planetary gear set imposes a fixed linear speed relationship as discussed above. The combination of gear set 40 and clutch 78 selectively imposes a linear speed relationship among the fourth shaft, the output, and the fifth shaft. The combination of gear set 40 and clutch 76 operatively selectively couple the fourth shaft to the fifth shaft. When clutch 76 is engaged, sun gear 46, carrier 42, and ring gear 48 rotate as a single unit. Since the fourth shaft includes sun gear 46 and the fifth shaft includes ring gear 48, the fourth and fifth shafts have the same speed whenever clutch 76 is engaged.

As shown in Table 3, engaging the clutches and brakes in combinations of three establishes ten forward speed ratios and one reverse speed ratio between input shaft 10 and output shaft 12. When the gear sets of FIG. 2 have tooth numbers as indicated in Table 1, the speed ratios have the values indicated in Table 3. The transmission of FIG. 2 is operated analogously to the transmission of FIG. 1 as described above.

TABLE 3

|  | 60/74 | 62/72 | 64 | 76 | 78 | 70 | Ratio | Step |
|---|---|---|---|---|---|---|---|---|
| Rev | X | X |  |  | X |  | −4.04 | 86% |
| $1^{st}$ | X | X | X |  |  |  | 4.70 |  |
| $2^{nd}$ | X | X |  | X |  |  | 2.97 | 1.58 |
| $3^{rd}$ |  | X | X | X |  |  | 2.03 | 1.46 |
| $4^{th}$ |  | X |  | X |  | X | 1.66 | 1.22 |
| $5^{th}$ |  | X | X |  |  | X | 1.46 | 1.14 |
| $6^{th}$ |  | X | X |  | X |  | 1.26 | 1.16 |
| $7^{th}$ |  |  | X |  | X | X | 1.00 | 1.26 |
| $8^{th}$ | X |  | X |  | X |  | 0.84 | 1.19 |
| $9^{th}$ | X |  | X |  |  | X | 0.69 | 1.22 |
| $10^{th}$ | X |  |  |  | X | X | 0.63 | 1.09 |

Figure 3:
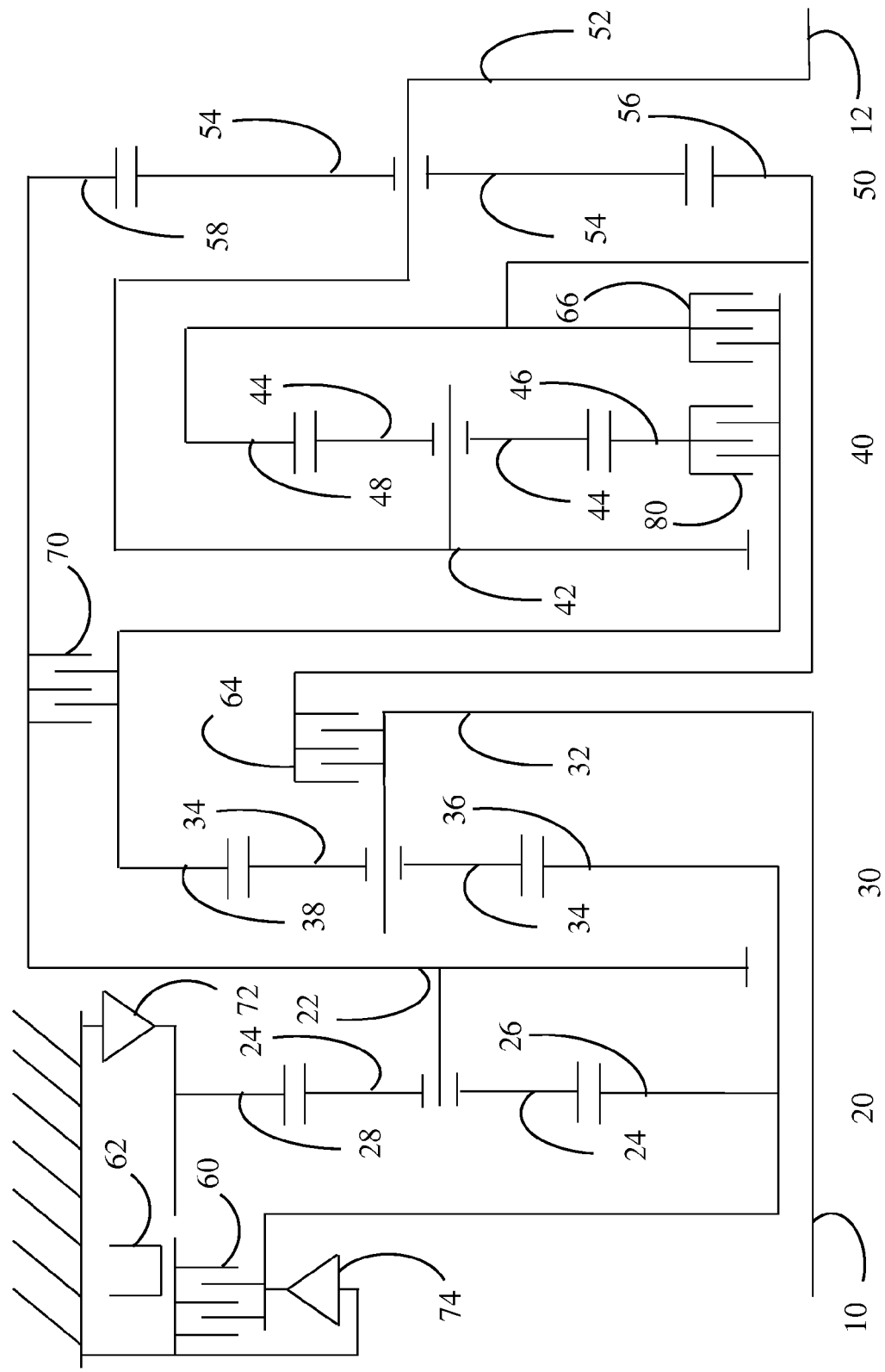
FIG. 3 is a schematic diagram of a third transmission gearing arrangement.

A third example transmission is schematically illustrated in FIG. 3. The transmission utilizes four simple planetary gear sets 20, 30, 40, and 50. A suggested ratio of gear teeth for each planetary gear set in FIG. 1 is listed in Table 1. Sun gear 26 is fixedly coupled to sun gear 36 forming a first shaft, carrier 22 is fixedly coupled to ring gear 58 forming a second shaft, ring gear 28 forms a third shaft, ring gear 38 forms a fourth shaft, ring gear 48 is fixedly coupled to sun gear 56 forming a fifth shaft, sun gear 46 forms a sixth shaft, input shaft 10 is fixedly coupled to carrier 32, and output shaft 14 is fixedly coupled to carrier 42 and carrier 52.

Ring gear 48 and sun gear 56 are selectively coupled to input 10 by clutch 64 and selectively coupled to ring gear 38 by clutch 66. Ring gear 38 is selectively coupled to carrier 22 and ring gear 58 by clutch 70 and selectively coupled to sun gear 46 by clutch 80. Clutches 64, 66, 70, and 80 may be hydraulically actuated multi-plate wet friction clutches. Ring gear 28 is selectively held against rotation by dog clutch 62. Optional one way brake 72, if present, passively holds ring gear 28 against rotation in a reverse direction (opposite to the direction of engine rotation) while permitting rotation in a positive direction. Sun gears 26 and 36 are selectively held against rotation by brake 60 which may be a hydraulically actuated wet friction brake. Optional one way brake 74, if present, passively holds sun gears 26 and 36 against rotation in a reverse direction while permitting rotation in a positive direction.

Several combinations of components collectively impose particular speed relationships. Each planetary gear set imposes a fixed linear speed relationship as discussed above. The combination of gear set 40 and clutch 80 selectively imposes a linear speed relationship among the fourth shaft, the output, and the fifth shaft. The combination of gear set 40 and gear set 50 fixedly imposes a fixed linear speed relationship among the fifth shaft, the output, the second shaft, and the sixth shaft. Any combination of two planetary gear sets with two elements of the first gear set fixedly coupled to two elements of the second gear set, respectively, would impose a fixed linear speed relationship among four shafts.

As shown in Table 4, engaging the clutches and brakes in combinations of three establishes ten forward speed ratios and one reverse speed ratio between input shaft 10 and output shaft 12. When the gear sets of FIG. 3 have tooth numbers as indicated in Table 1, the speed ratios have the values indicated in Table 4. The transmission of FIG. 3 is operated analogously to the transmission of FIG. 1 as described above.

TABLE 4

|  | 60/74 | 62/72 | 64 | 66 | 80 | 70 | Ratio | Step |
|---|---|---|---|---|---|---|---|---|
| Rev | X | X |  |  | X |  | −4.04 | 86% |
| $1^{st}$ | X | X | X |  |  |  | 4.70 |  |
| $2^{nd}$ | X | X |  | X |  |  | 2.97 | 1.58 |
| $3^{rd}$ |  | X | X | X |  |  | 2.03 | 1.46 |
| $4^{th}$ |  | X |  | X |  | X | 1.66 | 1.22 |
| $5^{th}$ |  | X | X |  |  | X | 1.46 | 1.14 |
| $6^{th}$ |  | X | X |  | X |  | 1.26 | 1.16 |
| $7^{th}$ |  |  | X |  | X | X | 1.00 | 1.26 |
| $8^{th}$ | X |  | X |  | X |  | 0.84 | 1.19 |
| $9^{th}$ | X |  | X |  |  | X | 0.69 | 1.22 |
| $10^{th}$ | X |  |  |  | X | X | 0.63 | 1.09 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   first, second, third, fourth, and fifth shafts;
   a first gearing arrangement configured to fixedly impose a linear speed relationship among the first shaft, the second shaft, and the third shaft;
   a second gearing arrangement configured to fixedly impose a linear speed relationship among the first shaft, the input, and the fourth shaft;
   a third gearing arrangement configured to selectively impose a linear speed relationship among the fourth shaft, the output, and the fifth shaft;
   a fourth gearing arrangement configured to fixedly impose a linear speed relationship among the fifth shaft, the output, and the second shaft;
   a positive engagement shift element configured to selectively hold the third shaft against rotation; and
   a first clutch configured to selectively couple the second shaft to the fourth shaft.

2. The transmission of claim 1 wherein the positive engagement shift element is a dog clutch.

3. The transmission of claim 1 further comprising:
   a brake configured to selectively hold the first shaft against rotation;
   a second clutch configured to selectively couple the input to the fifth shaft; and
   a third clutch configured to operatively selectively couple the fourth shaft to the fifth shaft.

4. The transmission of claim 3 wherein the third clutch is further configured to selectively couple the fourth shaft directly to the fifth shaft.

5. The transmission of claim 3 further comprising a first one way clutch configured to passively restrain the third shaft from rotation in a reverse direction.

6. The transmission of claim 3 further comprising a second one way clutch configured to passively restrain the first shaft from rotation in a reverse direction.

7. The transmission of claim 3 wherein the first gearing arrangement comprises:
   a sun gear fixedly coupled to the first shaft;
   a ring gear fixedly coupled to the third shaft;
   a carrier fixedly coupled to the second shaft; and
   a plurality of planet gears supported for rotation with respect to the carrier and in continuous meshing engagement with the sun gear and the ring gear.

8. The transmission of claim 3 wherein the second gearing arrangement comprises:
   a sun gear fixedly coupled to the first shaft;
   a ring gear fixedly coupled to the fourth shaft;
   a carrier fixedly coupled to the input; and
   a plurality of planet gears supported for rotation with respect to the carrier and in continuous meshing engagement with the sun gear and the ring gear.

9. The transmission of claim 3 wherein the third gearing arrangement comprises:
   a sun gear fixedly coupled to the fourth shaft;
   a ring gear;
   a carrier fixedly coupled to the output;
   a plurality of planet gears supported for rotation with respect to the carrier and in continuous meshing engagement with the sun gear and the ring gear; and
   a fourth clutch configured to selectively couple the ring gear to the fifth shaft.

10. The transmission of claim 3 wherein the third gearing arrangement comprises:
    a sun gear fixedly coupled to the fourth shaft;
    a ring gear fixedly coupled to the fifth shaft;
    a carrier;
    a plurality of planet gears supported for rotation with respect to the carrier and in continuous meshing engagement with the sun gear and the ring gear; and
    a fourth clutch configured to selectively couple the carrier to the output.

11. The transmission of claim 10 wherein the third clutch is further configured to selectively couple the carrier directly to the sun gear.

12. The transmission of claim 3 wherein the third gearing arrangement comprises:
    a sun gear;
    a ring gear fixedly coupled to the fifth shaft;
    a carrier fixedly coupled to the output;
    a plurality of planet gears supported for rotation with respect to the carrier and in continuous meshing engagement with the sun gear and the ring gear; and
    a fourth clutch configured to selectively couple the sun gear to the fourth shaft.

13. The transmission of claim 3 wherein the fourth gearing arrangement comprises:
    a sun gear fixedly coupled to the fifth shaft;
    a ring gear fixedly coupled to the second shaft;
    a carrier fixedly coupled to the output; and
    a plurality of planet gears supported for rotation with respect to the carrier and in continuous meshing engagement with the sun gear and the ring gear.

14. A transmission comprising:
    gearing fixedly imposing
      a linear speed relationship among a first shaft, a second shaft, and a third shaft;
      a linear speed relationship among the first shaft, an input, and a fourth shaft; and
      a linear speed relationship among a fifth shaft, an output, the second shaft, and a sixth shaft;
    a dog clutch selectively holding the third shaft against rotation; and
    a first clutch selectively coupling the second and the fourth shafts.

15. The transmission of claim 14 further comprising:
    a brake selectively holding the first shaft against rotation;
    a second clutch selectively coupling the input to the fifth shaft; and
    a third clutch selectively coupling the fourth shaft to the fifth shaft.

16. The transmission of claim 15 further comprising a first one-way-clutch passively restraining the third shaft from rotation in a reverse direction.

17. The transmission of claim 15 further comprising a second one-way-clutch passively restraining the first shaft from rotation in a reverse direction.

18. The transmission of claim 14 wherein the gearing comprises:
- a first sun gear fixedly coupled to the sixth shaft;
- a first ring gear fixedly coupled to the fifth shaft;
- a first carrier fixedly coupled to the output;
- a second sun gear fixedly coupled to the fifth shaft;
- a second ring gear fixedly coupled to the second shaft; and
- a second carrier fixedly coupled to the output.

19. A transmission comprising:
- an input;
- an output;
- first, second, third, fourth, fifth, and sixth shafts;
- a first gearing arrangement configured to fixedly impose a linear speed relationship among the first shaft, the second shaft, and the third shaft;
- a second gearing arrangement configured to fixedly impose a linear speed relationship among the first shaft, the input, and the fourth shaft;
- a third gearing arrangement configured to fixedly impose a linear speed relationship among the fourth shaft, the output, and the sixth shaft;
- a fourth gearing arrangement configured to fixedly impose a linear speed relationship among the fifth shaft, the output, and the second shaft;
- a first clutch configured to selectively couple the second shaft to the fourth shaft;
- a second clutch configured to selectively couple the input to the fifth shaft;
- a third clutch configured to selectively couple the fourth shaft to the fifth shaft; and
- a fourth clutch configured to selectively couple the sixth shaft to the fifth shaft.

20. The transmission of claim 19 further comprising a positive engagement shift element configured to selectively hold the third shaft against rotation.

21. The transmission of claim 19 further comprising a dog clutch configured to selectively hold the third shaft against rotation.

22. The transmission of claim 19 further comprising a one way clutch configured to passively restrain the third shaft from rotation in a reverse direction.

23. The transmission of claim 19 further comprising a brake configured to selectively hold the first shaft against rotation.

24. The transmission of claim 19 further comprising a one way clutch configured to passively restrain the first shaft from rotation in a reverse direction.

* * * * *